S. B. TILY & M. O. & J. G. REHFUSS.
CASH REGISTER.
APPLICATION FILED JAN. 29, 1910.

1,058,645.

Patented Apr. 8, 1913.

Witnesses.

Inventors.
Stephen B. Tily.
Martin O. Rehfuss.
John G. Rehfuss.
By their Attorneys
Howson & Howson

S. B. TILY & M. O. & J. G. REHFUSS.
CASH REGISTER.
APPLICATION FILED JAN. 29, 1910.

1,058,645.

Patented Apr. 8, 1913.

Witnesses—
Titus H. Ivors.
Wills A. Burrowes.

Inventors—
Stephen B. Tily.
Martin O. Rehfuss.
John G. Rehfuss.
by their Attorneys
Howson & Howson S. B. TILY & M. O. & J. G. REHFUSS.
CASH REGISTER.
APPLICATION FILED JAN. 29, 1910.

1,058,645.

Patented Apr. 8, 1913.

Witnesses.—

Inventors.—
Stephen B. Tily.
Martin O. Rehfuss.
John G. Rehfuss.
by their Attorneys

S. B. TILY & M. O. & J. G. REHFUSS.
CASH REGISTER.
APPLICATION FILED JAN. 29, 1910.

1,058,645.

Patented Apr. 8, 1913.

Witnesses,—

Inventors:
Stephen B. Tily.
Martin O. Rehfuss.
John G. Rehfuss.
by their Attorneys:
Howson & Howson

200 # UNITED STATES PATENT OFFICE.

STEPHEN B. TILY, MARTIN O. REHFUSS, AND JOHN G. REHFUSS, OF PHILADELPHIA, PENNSYLVANIA, ASSIGNORS TO JOHN WANAMAKER, OF PHILADELPHIA, PENNSYLVANIA.

CASH-REGISTER.

1,058,645.   Specification of Letters Patent.   Patented Apr. 8, 1913.

Application filed January 29, 1910. Serial No. 541,153.

*To all whom it may concern:*

Be it known that we, STEPHEN B. TILY, MARTIN O. REHFUSS, and JOHN G. REHFUSS, citizens of the United States, residing in Philadelphia, Pennsylvania, have invented certain Improvements in Cash-Registers, of which the following is a specification.

One object of our invention is to provide a cash register having a plurality of cash drawers, in combination with printing mechanism for indicating the amount of a sale, etc., which mechanism shall include an element controlled by said cash drawers so that each record produced shall indicate the person who made the sale and the drawer in which the money received for such sale was placed. These objects and other advantageous ends we secure as hereinafter set forth, reference being had to the accompanying drawings, in which:—

In the above drawings, 1 represents an inclosed case of suitable construction, within which are slidably mounted any number of cash drawers, in the present instance three, indicated at 2, 3 and 4. Each of these drawers has its own lock, indicated at 5, $5^a$ and $5^b$, and it will be understood that under operating conditions three separate sales persons are intended to use the machine, each having a key fitting the lock of that drawer for whose contents he may be responsible. Upon the casing 1 is mounted the casing 6 of the register proper, which has an operating handle 7 projecting at one or the other side, as may be desired. The front top portion of said casing is flat, while its rear portion has an upwardly projecting extension 8 within which are mounted the printing wheels and their associated mechanism.

Figure 3:
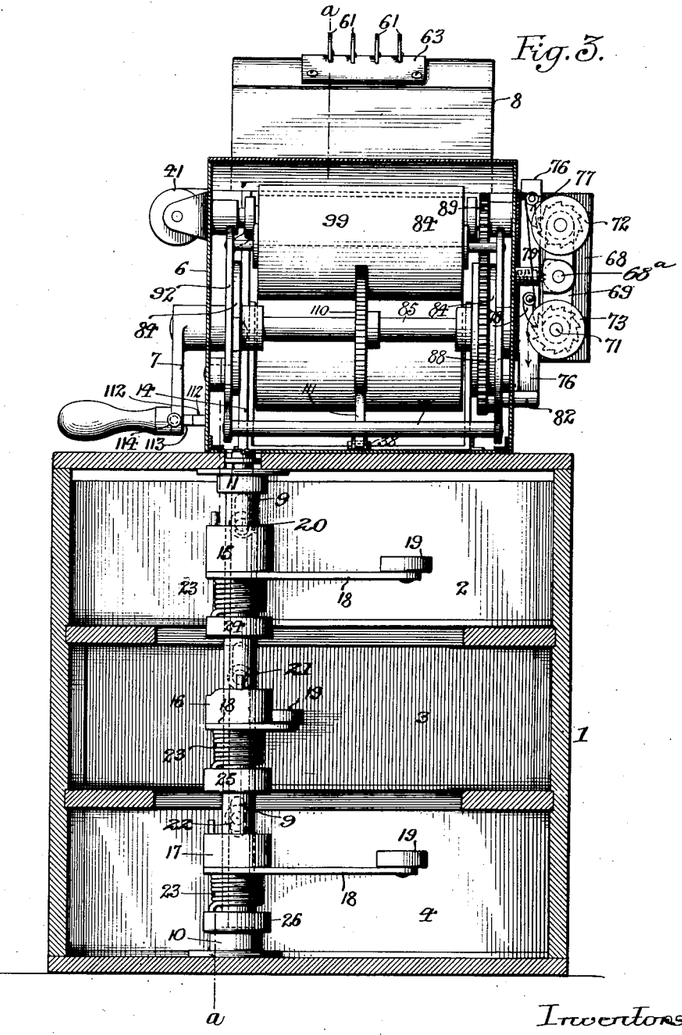
Fig. 3, is a transverse vertical section of the machine shown in Fig. 1.
Figure 4:
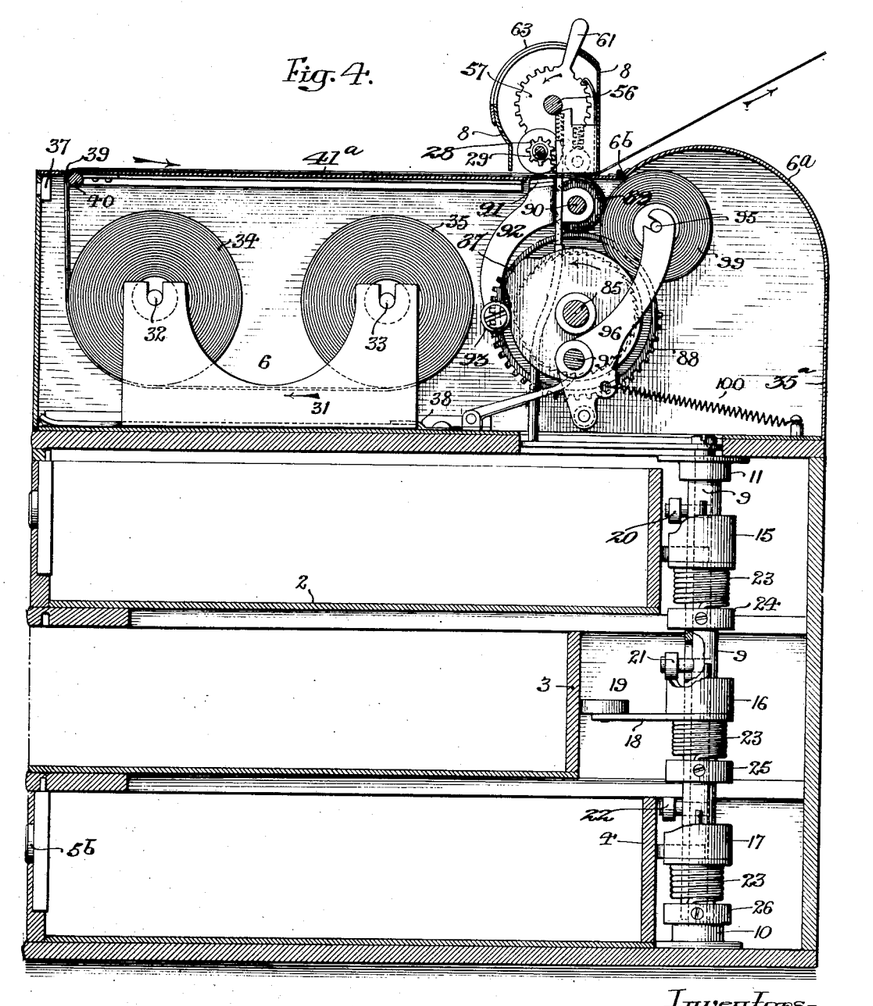
Fig. 4, is a longitudinal vertical section on the line $a$—$a$, Fig. 3.
Figures 8, 9, 10, 11:
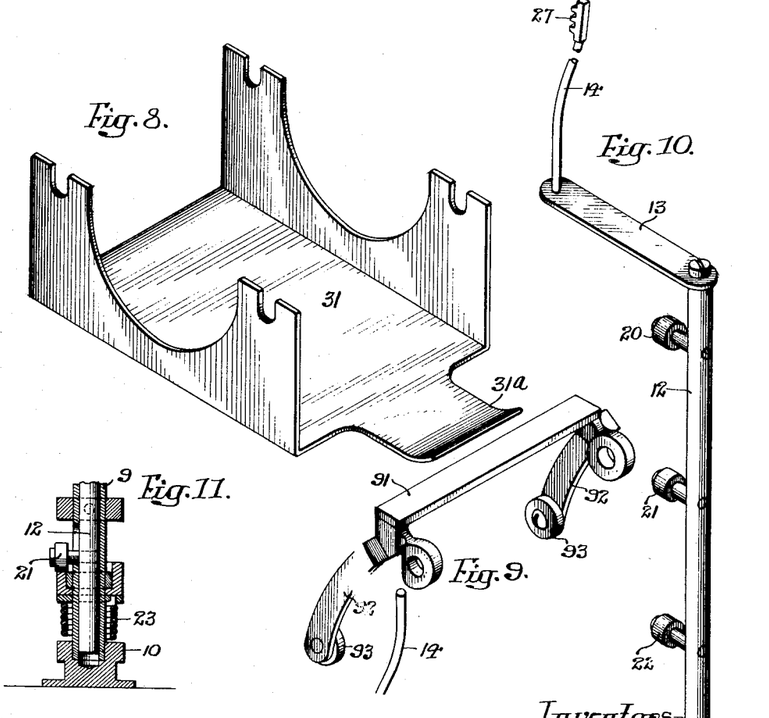
Fig. 8, is a perspective view of the carrier for supporting rolls of blank paper.
Fig. 9, is a perspective view of the printing platen.
Fig. 10, is a perspective view of the member for transmitting movement from the various drawers to one of the printing wheels.
Fig. 11, is a fragmentary vertical section illustrating the construction of the drawer opening device and of the means for actuating one of the printing wheels therefrom.

As shown best in Figs. 3, 4, and 11, there is within the case 1, immediately to the rear of the various drawers, a vertically supported tube 9 carried in and fixed to suitable supporting brackets 10 and 11 at the top and bottom of said case. Within this tube is a spindle 12 free to move vertically and having fixed to its upper end a laterally projecting arm 13, which in turn carries at its end an upwardly extending rod 14. Immediately to the rear of each of the drawers are sleeves or collars, indicated at 15, 16 and 17 respectively, revolubly mounted on the tube 9 and each having projecting from it an arm 18 terminating in a roller 19 designed to bear against the rear end of a drawer. The upper edges of the sleeves are irregular in form and are designed to respectively co-act with rollers 20, 21, or 22, as the case may be, carried on pins projecting from the spindle 12 through suitable openings in the tube 9. These three cams formed by the sleeves 15, 16 and 17 are of different heights; that is to say, each one is capable of moving its particular roller to an extent different from the others, and in the present instance, the lowermost cam 17 is designed, when revolved, to raise its roller and with it the spindle 12, for a minimum distance, while the cam formed by the sleeve 15 is designed to raise said spindle for a maximum distance; the cam 16 having an intermediate throw.

Figure 5:
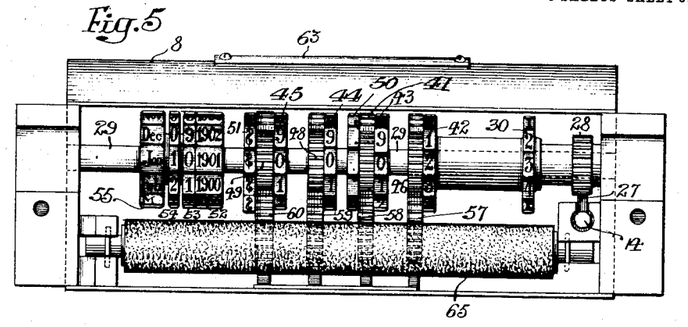
Fig. 5, is an inverted plan view illustrating the construction and arrangement of the printing wheels and certain of their associated parts.

The rollers 19 carried by the arms 18 are pressed against the rear of the drawers, and the sleeves to which they are fixed are caused to turn on the tube 9, by means of spiral springs 23; these springs being each connected at one end to one of the sleeves 15, 16, or 17, as the case may be, and at their opposite ends being connected to collars 24, 25 and 26, respectively, fixed to said tube 9. By reason of this arrangement, whenever the lock on any one of the drawers 2, 3 or 4, is released, said drawer is at once forced to its open position by its particular spring 23, acting through an arm 18 and its roller 19. At the same time, the sleeve attached to said arm 18 is likewise turned, thus causing its cam edge to act upon that one of the rollers 20, 21, or 22, with which it engages, to raise the spindle 12. As shown in Figs. 5 and 10, the upper end of the rod 14 carried by the arm 13 of the spindle 12, is provided with a toothed rack 27 which meshes with the teeth of a gear wheel 28, loosely carried on a shaft 29 mounted in the extension 8 of the register casing. This gear wheel is connected through a sleeve to a number wheel 30, which is designed to coöperate with certain other mechanism hereafter described, to make a record under predetermined conditions.

Within the casing 6 of the register proper, is mounted a roll carriage 31, (Figs. 4 and 8), having two sets of bearings for spindles 32 and 33 which are designed to carry webs of blank sales slips. These webs are in the form of rolls 34 and 35, and said carriage may be removed or inserted through the front end 35ª of the casing 6 which is hinged at the bottom and is normally held closed by a lock 37; the forward movement of the carriage being limited by a stop 38, on the bottom of the casing. In the extreme front of the top flat surface of the casing 6 is a narrow slot 39 having a smooth rod or pulley 40 mounted within said casing immediately adjacent to it, and the paper from the roll 34 is passed over this rod or pulley, upwardly through the slot 39, and then rearwardly over said flat top surface. The paper from the roll 35 is then passed forwardly under and around the roll 34, then upwardly through the slot 39, and rearwardly over the web from said roll 34.

Just in front of the casing extension 8 we mount rollers 41 on opposite sides of the machine, in such positions that their top surfaces are just below the top surface of the casing 6 and place on them an endless ink ribbon or carbon sheet 41ª, so that its runs extend transversely over this top surface of the casing; there being a knob or handle 41ᵇ on one of the rollers whereby it, with the ribbon may be moved at will.

The casing extension 8 is fastened to the main casing 6 in any desired manner, and as before noted, has extending longitudinally through its lower portion, a shaft 29. On this shaft are loosely mounted number-carrying type wheels 42, 43, 44, and 45, to which are respectively fixed pinions 46, 47, 48 and 49. There is also fixed to the pinion 47 a "point" carrying wheel 50, while the pinion 49 has also fixed to it a wheel carrying dollar marks 51. Also loosely mounted on the shaft 29 are four other type carrying wheels 52, 53, 54 and 55, of which the first carries type indicating the year, the next two wheels have type indicating the day of the week, and last has type indicating the month. These four latter wheels may be adjusted upon the shaft from time to time so as to bring the particular symbols which it is desired to print, at their lowest possible points on the wheels.

Figure 2:
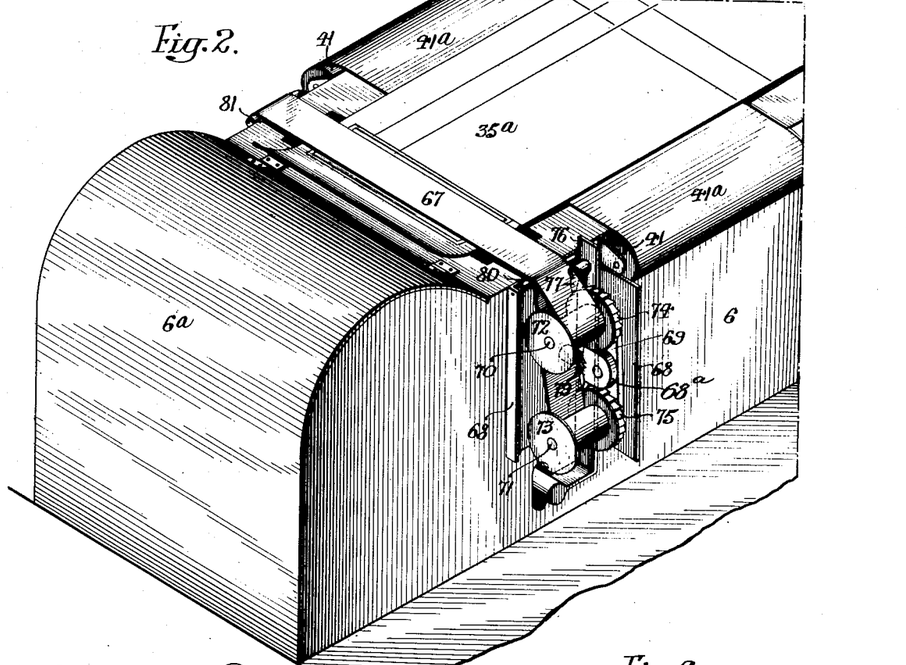
Fig. 2, is a perspective view of one end of our improved register, illustrating the detail construction of the ribbon operating mechanism.
Figure 6:
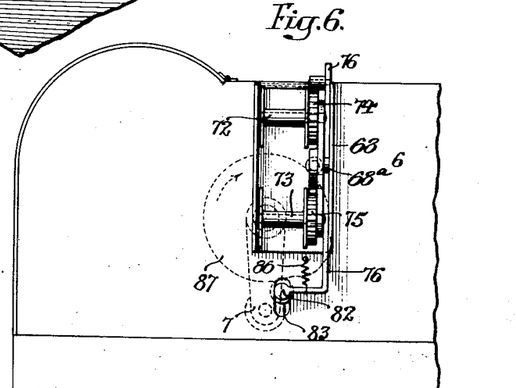
Fig. 6, is a side elevation illustrating a portion of the ribbon controlling mechanism.
Figure 7:
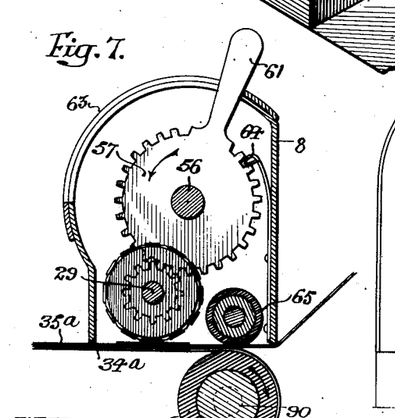
Fig. 7, is a vertical section illustrating the means for actuating one of the printing wheels.

Mounted in suitable bearings in the casing extension 8 and extending parallel with the shaft 29 and above the same, is a second shaft 56, on which are loosely mounted four gear wheels 57, 58, 59 and 60, respectively meshing with the gear wheels 46, 47, 48 and 49. Each of said gear wheels on the shaft 56 is provided with an operating handle 61 and all of the handles extend radially through slots 62 in a curved plate 63 attached to and forming part of the casing extension 8; the arrangement being such that movement of any handle 61 in its slot causes a turning of the particular gear to which it is attached and also of the gear on the shaft 29 meshing therewith, as well as of the number wheel attached to said latter gear. In order that the gears 57, 58, etc., may be held in any position in which they are placed by the handle 61, we provide each of them with a spring pawl 64 mounted inside the casing extension 8 and so formed as to permit such turning of the gear in both directions as may be accomplished by its operating handle, while holding it from accidental moving. Also mounted in the casing A, to the rear of the shaft 29 and its gears and number wheels, is a nip roll 65, preferably rubber covered, and designed to co-act with a second nip roll 66 supported in the body of the casing 6, immediately under it; the arrangement being such that the line of contact of these two rolls coincides approximately with the plane of the flat top of the casing 6. The casing extension 8 is cut away or slotted at its extreme lower front and rear portions so as to permit of the passage of the paper web over the top of the casing 6 and between the two rollers 65 and 66; the number wheels on the shaft 29 being of such diameters and so placed as to be immediately above the upper web of paper so that the lowermost numbers or symbols may be made to form a record thereon, as hereafter described. For this purpose we provide a relatively narrow ink ribbon extending in a duplicate run across the top of the casing 6 immediately under the series of type or number wheels 30, 42, 44, etc., on the shaft 29; the arrangement being such that, as shown in Figs. 4 and 7, the upper paper web 35$^a$ passes between the two runs of the ribbon 67, while the under web of paper 34$^a$ passes under the lower run of said ribbon. For the purpose of supporting and periodically feeding this latter, we provide the mechanism shown in Figs. 2, 3, and 6 which consists of a frame or bracket 68 mounted on one side of the casing 6 and having a pivot 68$^a$ on which is movably carried an elongated plate 69 designed to lie in an approximately vertical position. This plate provides bearings for a pair of spindles 70 and 71 on which are fixed ribbon spools 72 and 73 upon which the ink ribbon 67 is alternately wound. The spool 72 has fixed to it a ratchet wheel 74, while the spool 73 similarly has a ratchet wheel 75, and for the purpose of actuating these wheels we provide a vertically movable bar 76 carrying a pair of pawls 77 and 78.

The mounting of the plate 69 is such that when it has swung on its pivot to one extreme position, as in Fig. 3, its ratchet wheel 75 may be engaged by the pawl 78 when the bar 76 is vertically reciprocated, while when said plate is swung to its other extreme position, this pawl cannot engage its ratchet wheel, although such engagement is possible between the pawl 77 and ratchet wheel 74. The plate 69 is held in either of its two extreme positions by means of a spring pressed plunger 79 placed to engage either of two teeth formed in the edge of the plate 69.

The ink ribbon 67 extends from the lower spool 73 over the roller 80 at the top edge of the casing 6, then over a transverse opening formed in the top of the casing 6, around a roller 81, back across the casing parallel with and immediately above its lower run, and downwardly to the spool 72.

With this arrangement, when the ribbon has been so far wound upon one of the spools, for example the spool 73, by reason of the repeated movements given this latter by the pawl 78, that it is altogether unwound from the spool 72 to which one of its ends is fastened, the further turning of the spool 73 will cause a pull to be exerted upon the spool 72 in a direction toward the top edge of the casing 6. As a result, the plate 69 is swung on its pivot and the plunger 79 is forced out of its engagement with one of the teeth of the said plate and allowed to drop into the other, thereby holding it in such position that upon the next reciprocation of the bar 76, the pawl 77 will engage with the ratchet 74 to wind up the ribbon upon the spool 72, while the pawl 78 will be disengaged from the ratchet 75, thereby leaving the spool 73 free to unwind.

For reciprocating the bar 76, we connect its lower end to a stud 82 projecting through a suitably formed slot in the side of the casing 6 and carrying a roller 83 placed to engage the edge of one of the cams 87 fixed to the main operating shaft 85 to which the operating handle 7 is attached. Said cam is of such design that on each revolution of the operating shaft the roller 83, and with it the bar 76, is drawn down and then permitted to return to its upper position under the action of a spring 86.

As shown in Fig. 4, the operating shaft has fixed to it two cams 87 and an interrupted gear 88 provided with teeth for a length of its circumference equal to the length of the sales slips used in the machine; this toothed portion of said gear being designed to engage with the teeth of a gear 89 on the spindle 90 of the nip roll 66. On said spindle is fulcrumed a platen 91 for printing from the type wheels on the shaft 29, and as shown in Fig. 9, this platen consists of a flat member extending transversely of the casing 6 immediately under the ink ribbons 67 below the various type wheels. This member is carried on two arms 92, provided with collars for the reception of the shaft 90 and carrying a roll 93 designed to bear upon the edges of the cams 87.

To the rear of the nip roll 66 we roll up the under web 34$^a$ of paper in order to preserve the duplicate record of the sales slip, and for this purpose, we provide a supporting spindle 95 carried in a frame which consists of two side members 96 mounted to turn on two short spindles 97 projecting inwardly from opposite sides of the casing 6 so as not to interfere with any of the other mechanism therein. The side members 96 of this frame are extended below their supporting spindles and are rigidly connected by a transverse rod 98. As it is desired that the paper roll 99 on the spindle 95 shall be wound up by reason of the frictional action of the nip roll 66, it is caused to be pressed toward said nip roll by means of a spring 100 acting between the casing and some portion of one of the side members 96 below the line of the spindle 97.

Figure 12:
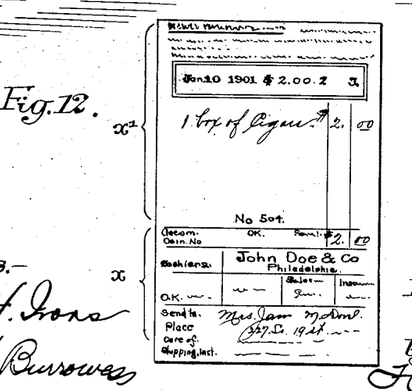
Fig. 12, is a plan of one of the sales slips as used by our machine.

The webs of paper wound upon the supply rolls 34 and 35 are printed, previous to their introduction into the machine, to form a succession of sales slips of the general form indicated in Fig. 12, and each of said slips has a blank portion, preferably near its top, in which the date, amount of sale, and number of operator are to be printed, as indicated at $x$, Fig. 12. Immediately below this top portion and constituting the body of the slip, is a portion $x'$ designed for the reception of the autographic record of the sale made by the operator, including the record of the amount of the sale and the cash received from the purchaser, etc. A space $x^2$ at the bottom of the sales slip is intended for the reception of the autographic record of the customer's name, address, the inspector's number, etc.

Under operating conditions, two webs of paper, printed as sales slips and wound in the forms of rolls, are mounted on suitable spindles and placed in the carriage 31, which is introduced into the casing 6 through the front end thereof. The end of the web from the roller 35 is then passed under and upwardly over the roll 40, and with the web from the roll 34, passes through the slot 39 in the front edge of the top surface of the casing 6, around the roller 40, then rearwardly over the flat top surface of the casing:—the web 34$^a$ passing between the two runs of the ink ribbon or carbon sheet 41$^a$ carried by the rollers 41, while the web 35$^a$ passes over the top run of this ribbon. As shown in Fig. 7, the two paper webs are now passed into the extension casing 8 through a narrow slotted opening in the lower front portion of the same, and the lower web 34$^a$ passes under the lower run of the narrow ink ribbon 67, while the upper web 35$^a$ passes between the two runs of this ribbon. Thence both of the webs pass between the nip rolls 65 and 66; the upper web being carried out of the extension casing 8 through a suitable slot in the lower rear edge of the same, while the other paper web 34$^a$ is carried to the roller on the spindle 95, to which it is attached in any suitable manner.

Figure 1:
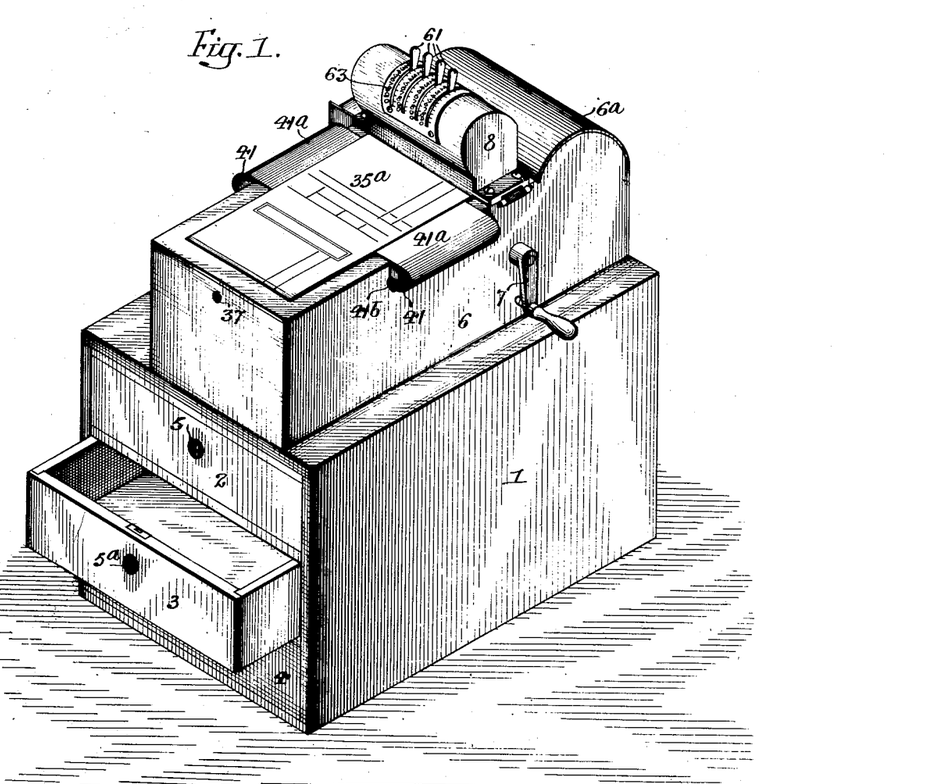
Figure 1, is a perspective view of a machine constructed according to our invention.

As shown in Fig. 1, the curved plate 63 on the extension casing 8 has slots 62 for the passage of the number wheel-operating handles 61, and there is on said plate, adjacent each slot, a series of figures, so placed with reference to the mechanism within the casing that when any one of the levers is opposite a particular number on the side of its slot, the number wheel actuated by said handle has the same number immediately above the ink ribbon 67, in position to make an impression.

After the various date wheels have been set, the machine is in position for operation and assuming that a sale has been made, the autographic record of the same is then entered on the sales slip whose portion $x'$ is immediately over the endless ribbon or carbon sheet 41$^a$. The forming of this record naturally produces a duplicate record on the under web 34$^a$, so that a copy of the original sales slip is preserved for the use of the proprietor of the establishment. The operator or sales person then opens that particular one of the drawers 2, 3 or 4, for whose contents he is responsible and of which he alone possesses the key. Owing to the spring 23, which, as previously described, is mounted to the rear of each drawer, the release of the lock 5$^a$ of the said drawer 3, for example, at once permits it to be forced outwardly into its open position. The consequent turning of the arm 18 in pushing out the drawer causes a corresponding angular revolution of the cam sleeve 16, so that the roller 21 operative thereon, is raised to a distance depending upon the design of said cam. As noted, however, said roller is connected to the vertical spindle 12, which, with the arm 13 and the rod 14, is therefore raised. The teeth 27 of said rod being in mesh with the teeth of the pinion 28, causes a partial revolution of the latter and with it of the number wheel 30, which is so mounted and designed that such partial revolution brings to the lowermost position that one of the numbers of said wheel designed to indicate the second drawer of the apparatus, which in this instance is indicated by 3. The cash from the sale is then placed in the drawer, or any change is made from the cash in the drawer, after which, by moving the proper handles 61 so that they are respectively opposite the numbers on the plate 63 which correspond to the amount of the sale made, the various number wheels 42, 43, 44 and 45 are moved to bring these same numbers into their lowermost positions, immediately above the ink ribbon 67. If now the handle 7 be given one or more revolutions (depending, of course, upon the proportioning of the gearing employed) there is, at first, no feeding forward of the paper webs, since when the handle is in its normal position, the gears occupy the relative positions shown in Fig. 4; that is to say, the teeth of the gear 88 are out of mesh with the teeth of the pinion 89 on the nip roll 66. The cams 87, however, are so mounted on the shaft that the immediate result of the first part of the turning of the crank handle 7 is to swing the arms 92 on their pivot spindle 90, thus moving upwardly the platen 91 and causing it to momentarily press the two paper webs 34$^a$ and 35$^a$, with the two runs of the ink ribbon 67, against the lowermost numbers of the various type and number wheels carried by the shaft 29. There is thus printed on both of the webs of paper a record of the date, the amount of the sale, and the number corresponding to and indicating the particular one of the drawers of the apparatus which has been opened. The remainder of the revolution of the handle 7 brings the teeth 88 of the interrupted gear on the shaft 85 into engagement with the teeth of the gear 9 and thereby causes a turning of the nip roll 66 sufficient to feed rearwardly both of the webs of paper to an extent exactly equal to the length of one sales slip. As a result, a second original sales slip and a second duplicate immediately under the same are brought into such positions that the space $x$ of said slips is put above the ink ribbon 67 and under the type and number wheels in the extension casing 8, while the main portion $x'$ of said slips is immediately over the wide ink ribbon 41$^a$. Owing to the fact that the roller on the spindle 95 presses against the surface of the nip roll 66, under the action of the spring 100, said roll is turned by the turning of the nip roll and is thereby caused to wind up the duplicate sales sheet formed on the web 34$^a$, while the original sales slip is fed out from the extension casing 8 over the rear end of the machine, and may be conveniently torn off from the succeeding original sales slip; the top edge of the slot in the rear of the said casing serving as a straight edge for this purpose. Another result of the turning of the handle 7 is that the roller 83 on the stud 82 is moved downwardly and is then permitted to return to its original position, so that the bar 76 is likewise moved down and then up, thus causing the pawl 78 to partially turn the ratchet wheel 75 with which it engages and feeding the two runs of the ink ribbon 67 a short distance in opposite directions under the number and type wheels. The sales person now closes and locks the drawer (which up to this point has been permitted to remain open) and restores the various handles 61 to their normal positions.

From time to time the broad duplicating ribbon 41$^a$ may be fed across the top of the casing by turning one of its supporting rollers 41 by means of a small head 41$^b$ on said roller. As previously described, when the narrow ink ribbon has been totally unwound from one of its carrying spools, its direction of feed is automatically reversed, while when the paper webs have been exhausted from the rolls 34 and 35, the front end 35$^a$ of the casing 6 may be opened and the carriage 31 drawn out by means of its projecting end 31$^a$, whereupon new rolls may be placed in it.

The stop 38 prevents the carriage 31 with its rolls being moved too far to the rear when it is inserted in the casing and thus avoids the paper roll interfering with any other parts of the mechanism. If desired, a ratchet wheel 110 may be mounted on the crank shaft 85 and a pawl 111 co-acting therewith may be mounted on the bottom of the casing, so that the handle 7 and its attached parts are kept from being turned backward. For the purpose of preventing said handle being turned more than the 1 or 2 revolutions necessary to feed a length of paper web equal to one sales slip, there is mounted on the side of the casing adjacent to said handle, a stop 112, and on the handle itself is placed a spring detent 113 controlled from a spring push button 114, it being understood that this detent is held retracted by the operator, while it passes the stop 12 in case the handle is given more than one revolution.

It is of course obvious that the number of drawers in the apparatus may be varied without departing from our invention and that a greater or less number of type and number wheels with their co-acting parts may be employed. From time to time the roll 99 of duplicate records may be removed from the casing 6, and for this purpose the rear end and a part of the top of said casing, indicated at 6$^a$, are hinged to the remainder at 6$^b$.

We claim:—

1. The combination in a cash register of a casing having a plurality of drawers; printing mechanism for recording a sale; a type wheel; and means for connecting said type wheel with each of the drawers for automatically turning the wheel when a drawer is moved outwardly, the amount of turning depending upon the drawer operated.

2. The combination with a cash register of a casing having a plurality of drawers; means normally tending to open said drawers; a type wheel actuated by said means to a different extent upon the opening of each of the drawers; and means for recording the amount of a sale, including a device for making a record from said drawer-controlled type wheel.

3. The combination in a cash register of a casing having a series of drawers; devices respectively tending to open said drawers; a vertical spindle acted on by said devices to different amounts when the various drawers are opened; type having movable supporting means and controlled by said vertical spindle; and means for recording the amount of a sale, including a device for making a record from said type.

4. The combination in a cash register of a casing having a series of drawers; spring actuated arms normally acting to open said drawers; a cam controlled by each of said arms; a vertically movable spindle having projections respectively acted on by said cams; a body of movably supported type; means for operatively connecting said spindle to said type; and means for recording the amount of a sale including means for making a record from said type.

5. The combination in a cash register of a casing having a series of drawers; a spindle mounted in bearings in said casing and having a plurality of projecting portions; a series of cams mounted on said spindle in position to act on the projecting portions thereof respectively; means for connecting said cams with the drawers; a toothed rack connected to the spindle; and printing mechanism including a printing wheel and a gear, the latter being placed to be engaged by the toothed rack.

6. The combination in a cash register of a casing having a plurality of drawers; spring actuated arms respectively placed to tend to open the drawers; printing mechanism; and means for connecting said arms with one of the elements of said printing mechanism to bring it to a position to make a record of the opening of the drawers.

In testimony whereof, we have signed our names to this specification, in the presence of two subscribing witnesses.

STEPHEN B. TILY.
MARTIN O. REHFUSS.
JOHN G. REHFUSS.

Witnesses:
WILLIAM E. BRADLEY,
WM. A. BARR.